US008560624B1

(12) United States Patent
Duan et al.

(10) Patent No.: US 8,560,624 B1
(45) Date of Patent: *Oct. 15, 2013

(54) METHOD OF DETECTING COMPROMISED COMPUTERS IN A NETWORK

(75) Inventors: Zhenhai Duan, Tallahassee, FL (US); Peng Chen, San Jose, CA (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,866

(22) Filed: Aug. 22, 2012

Related U.S. Application Data

(63) Continuation of application No. 12/762,714, filed on Apr. 19, 2010, now Pat. No. 8,280,968.

(60) Provisional application No. 61/170,894, filed on Apr. 20, 2009.

(51) Int. Cl.
G06F 15/16 (2006.01)
H04L 29/08 (2006.01)

(52) U.S. Cl.
CPC .............................. H04L 29/08072 (2013.01)
USPC ................. 709/206; 709/207; 726/1; 726/3; 726/23; 726/24; 726/25; 726/26; 713/182; 713/187; 713/188; 713/189

(58) Field of Classification Search
USPC ..................... 709/206–207; 726/22–25, 3, 1; 713/182, 187–189
See application file for complete search history.

(56) References Cited

U.S. PATENT DOCUMENTS

| 6,968,461 | B1 * | 11/2005 | Lucas et al. ..................... 726/22 |
| 7,051,077 | B2 * | 5/2006 | Lin ............................. 709/207 |
| 7,610,344 | B2 * | 10/2009 | Mehr et al. ..................... 709/206 |
| 7,664,812 | B2 * | 2/2010 | Daniell et al. ................ 709/200 |
| 7,882,542 | B2 * | 2/2011 | Neystadt et al. .................. 726/3 |
| 7,899,866 | B1 * | 3/2011 | Buckingham et al. ........ 709/206 |
| 7,930,353 | B2 * | 4/2011 | Chickering et al. .......... 709/206 |
| 8,006,305 | B2 * | 8/2011 | Aziz ............................... 726/24 |
| 8,069,471 | B2 * | 11/2011 | Boren .............................. 726/3 |
| 8,171,553 | B2 * | 5/2012 | Aziz et al. ........................ 726/24 |
| 2005/0071432 | A1 * | 3/2005 | Royston, III ................. 709/206 |
| 2006/0168024 | A1 * | 7/2006 | Mehr et al. .................... 709/206 |

(Continued)

OTHER PUBLICATIONS

Mengjun Xie, Heng Yin, Haining Wang, "An Effective Defense Against Email Spam Laundering", ACM conference CCS'06, Oct. 30, 2006-Nov. 3, 2006, pp. 179-190.*

(Continued)

*Primary Examiner* — Saket K Daftuar
(74) *Attorney, Agent, or Firm* — Andriy Lytvyn; Smith & Hopen, P.A.

(57) ABSTRACT

A method of detecting a compromised machine on a network. The method receives an email message from a machine on the network and classifies it as either spam or non-spam. A probability ratio is then updated, according to whether the message was spam or non-spam, by applying a sequential probability ratio test. If the probability ratio is greater than or equal to a first threshold, then the machine is compromised. If the probability ratio is less than or equal to a second threshold, then the machine is normal. The operations of receiving a message, classifying the message, updating the probability ratio, and indicating the machine is normal or compromised until the probability ratio is greater than or equal to the first threshold are repeated for a plurality of messages. Such repeated operations are performed on each of the messages one at a time, as each of the messages is received.

8 Claims, 8 Drawing Sheets

(56) References Cited

U.S. PATENT DOCUMENTS

| | | | |
|---|---|---|---|
| 2007/0038705 A1* | 2/2007 | Chickering et al. | 709/206 |
| 2007/0192855 A1* | 8/2007 | Hulten et al. | 726/22 |
| 2007/0250930 A1* | 10/2007 | Aziz et al. | 726/24 |
| 2007/0282955 A1* | 12/2007 | Lin et al. | 709/206 |
| 2008/0005782 A1* | 1/2008 | Aziz | 726/3 |
| 2008/0028463 A1* | 1/2008 | Dagon et al. | 726/22 |
| 2008/0080518 A1* | 4/2008 | Hoeflin et al. | 370/395.42 |
| 2008/0104186 A1* | 5/2008 | Wieneke et al. | 709/206 |
| 2008/0244748 A1* | 10/2008 | Neystadt et al. | 726/25 |
| 2010/0100962 A1* | 4/2010 | Boren | 726/25 |

OTHER PUBLICATIONS

Duan et al., Behavioral Characteristics of Spammers and Their Network Reachability Properties, IEEE International Conference on Communications, Jun. 2007.

Gu et al., BotHunter: Detecting Malware Infection Through IDS-Driven Dialog Correlation, Proc. 16th USENIX Security Symposium, Boston, MA, Aug. 2007.

Xie et al., Spamming Botnets: Signatures and Characteristics, Proc. ACM SIGCOMM, Seattle, WA, Aug. 2008.

Zhuang et al., Characterizing Botnets from Email Spam Records, Proc. of 1st Usenix Workshop on Large-Scale Exploits and Emergent Threats, San Francisco, CA, Apr. 2008.

Xie et al., An Effective Defense Against Email Spam Laundering, ACM Conference on Computer and Communications Security, Alexandria, VA, Oct. 30, 2006-Nov. 3, 2006.

Wald, Sequential Analysis, 1947, John Wiley & Sons, Inc., pp. 37-69.

Xie, M.; Yin, H; and Wang, H. Thwarting E-mail Spam Laundering. ACM Transactions on Information and System Security, vol. 12, No. 2, Article 13, 32 pages, Dec. 2008.

* cited by examiner

1: An outgoing message arrives at SPOT
2: Get IP address of sending machine $m$
3: // all following parameters specific to machine $m$
4: Let $n$ be the message index
5: Let $X_n = 1$ if message is spam, $X_n = 0$ otherwise
6: if ($X_n == 1$) then
7:     // spam, Eq. 3
8:     $\Lambda_n\mathrel{+}= ln\frac{\theta_1}{\theta_0}$
9: else
10:     // nonspam
11:     $\Lambda_n\mathrel{+}= ln\frac{1-\theta_1}{1-\theta_0}$
12: end if
13: if ($\Lambda_n \geq B$) then
14:     Machine $m$ is compromised. Test terminates for $m$.
15: else if ($\Lambda_n \leq A$) then
16:     Machine $m$ is normal. Test is reset for $m$.
17:     $\Lambda_n = 0$
18:     Test continues with new observations
19: else
20:     Test continues with an additional observation
21: end if

*FIG. 2A*

| Measure | Non-spam | Spam | Aggregate |
|---|---|---|---|
| Period | 8/25/2005 – 10/24/2005 (excld. 9/11/2005) | | |
| # of emails | 6,712,392 | 18,537,364 | 25,249,756 |
| # of university emails | 5,612,245 | 6,959,737 | 12,571,982 |
| # of infected emails | 60,004 | 163,222 | 223,226 |
| # of infected univ. emails | 34,345 | 43,687 | 78,032 |

| | Total | Non-spam only | Spam only | Mixed |
|---|---|---|---|---|
| # of IP (%) | 2,461,114 | 121,103 (4.9) | 2,224,754 (90.4) | 115,257 (4.7) |
| # of univ. IP (%) | 440 | 175 (39.7) | 74 (16.8) | 191 (43.5) |

| | Total | Non-spam only | Spam only | Mixed |
|---|---|---|---|---|
| # of IP | 10,385 | 1,032 | 6,705 | 2,648 |
| # of univ. IP | 204 | 19 | 42 | 143 |

| Total # Univ. IP | Detected | Confirmed (%) | Missed (%) |
|---|---|---|---|
| 440 | 132 | 126 (94.7) | 7 (5.3) |

METHOD OF DETECTING COMPROMISED COMPUTERS IN A NETWORK

CROSS REFERENCE TO RELATED APPLICATIONS

This application is a continuation of U.S. patent application Ser. No. 12/762,714, titled "Method of Detecting Compromised Computers in a Network," filed Apr. 19, 2010, which is herein incorporated by reference, which claims the benefit of priority to U.S. Provisional Patent Application 61/170,894, titled "Method of Detecting Compromised Computers in a Network," filed Apr. 20, 2009, which is herein incorporated by reference.

FIELD OF INVENTION

This invention relates to network security; more specifically, to the detection of compromised computers by monitoring email messages originating from and forwarded by computers on the network.

BACKGROUND

A major security challenge on the Internet is the existence of the large number of compromised machines. Such machines have been increasingly used to launch various security attacks including DDoS, spamming, and identity theft. Two natures of the compromised machines on the Internet—sheer volume and wide spread—render many existing security countermeasures less effective and defending attacks involving compromised machines extremely hard. On the other hand, identifying and cleaning compromised machines in a network remain a significant challenge for system administrators of networks of all sizes.

The subset of compromised machines that are used for sending spam messages are commonly referred to as spam zombies. Given that spamming provides a critical economic incentive for the controllers of the compromised machines to recruit these machines, it has been widely observed that many compromised machines are involved in spamming. A number of recent research efforts have studied the aggregate global characteristics of spamming botnets (networks of compromised machines involved in spamming) such as the size of botnets and the spamming patterns of botnets, based on the sampled spam messages received at a large email service provider.

Based on email messages received at a large email service provider, two recent studies (Y. Xie et al. and L. Zhuang et al.) investigated the aggregate global characteristics of spamming botnets including the size of botnets and the spamming patterns of botnets. Y. Xie, F. Xu, K. Achan, R. Panigrahy, G. Hulten, and I. Osipkov, "Spamming Botnets: Signatures and Characteristics," in *Proc. ACM SIGCOMM*, Seattle, Wash. (August 2008); L. Zhuang, J. Dunagan, D. R. Simon, H. J. Wang, I. Osipkov, G. Hulten, and J. D. Tygar, "Characterizing Botnets from Email Spam Records," in *Proc. of 1st Usenix Workshop on Large-Scale Exploits and Emergent Threats*, San Francisco, Calif. (April 2008). These studies provided important insights into the aggregate global characteristics of spamming botnets by clustering spam messages received at the provider into spam campaigns using embedded URLs and near-duplicate content clustering, respectively. However, their approaches are better suited for large email service providers to understand the aggregate global characteristics of spamming botnets instead of being deployed by individual networks to detect internal compromised machines. Moreover, their approaches cannot support the online detection requirement in the network environment.

Xie, et al. developed an effective tool DBSpam to detect proxy-based spamming activities in a network relying on the packet symmetry property of such activities. M. Xie, H. Yin, and H. Wang, "An effective defense against email spam laundering," in *ACM Conference on Computer and Communications Security*, Alexandria, Va., (Oct. 30, 2006-Nov. 3, 2006). This technique only identifies the spam proxies that translate and forward upstream non-SMTP packets (for example, HTTP) into SMTP commands to downstream mail servers. It does not identify all types of compromised machines involved in spamming.

BotHunter, developed by Gu et al., detects compromised machines by correlating the IDS dialog trace in a network. G. Gu, P. Porras, V. Yegneswaran, M. Fong, and W. Lee, "BotHunter: Detecting Malware Infection Through IDS-Driven Dialog Correlation," in *Proc. 16th USENIX Security Symposium*, Boston, Mass., (August 2007). It was developed based on the observation that a complete malware infection process has a number of well-defined stages including inbound scanning, exploit usage, egg downloading, outbound bot coordination dialog, and outbound attack propagation. By correlating inbound intrusion alarms with outbound communications patterns, BotHunter can detect the potential infected machines in a network. BotHunter relies on the specifics of the malware infection process and requires support from the network intrusion detection system.

SUMMARY

The present invention includes a spam zombie detection system that detects compromised machines by monitoring the outgoing email messages originated or forwarded by machines inside the network. A machine originating or forwarding sufficient email spam messages is flagged as a compromised machine. The monitoring point may be co-located with the mail transfer agent (MTA) server(s) deployed by the network; it may also be located in a machine separated from the MTA servers. In the latter case, MTA servers need to replicate the outgoing messages to the monitoring point, in addition to the regular email deliveries. The present invention also includes a method of examining if a machine has generated sufficient spam messages to be flagged as being compromised.

In an embodiment, the method of detecting a compromised machine on a network begins by receiving an email message from a machine on the network. The email message may originate from the machine or the email message may be forwarded by the machine. The email message is then classified as either spam or non-spam. Such classification may be carried out by a spam filter and such a spam filter may be a content-based spam filter. The classification may also be carried out using user feedback. A probability ratio is then updated by applying a sequential probability ratio test (SPRT). The probability ratio is updated according to whether the email message was classified as spam or non-spam. If the probability ratio is greater than or equal to a first predetermined threshold (B), then the status of the machine is indicated as compromised. If the probability ratio is less than or equal to a second predetermined threshold (A), then the status of the machine is indicated as normal and the probability ratio is reset. The operations of receiving an email message, classifying the email message, updating the probability ratio, and indicating the machine is normal or compromised until the probability ratio is greater than or equal to the first predetermined threshold are repeated for a plurality of email messages. Such repeated operations are performed on each of the plurality of email messages one at a time as each of the plurality of email messages is received.

The SPRT may use the approximate probability that an email message transmitted by a machine on the network is spam if the computer is compromised and the approximate probability that an email message transmitted by the machine is spam if the computer is not compromised.

If the email message is classified as spam, the probability ratio may be updated according to the equation $$\Lambda_n \mathrel{+}= \ln\frac{\theta_1}{\theta_0},$$

wherein $\Lambda_n$ represents the probability ratio, $\theta_0$ represents the probability that an email message received from a machine on the network is spam given that the machine is not compromised, and $\theta_1$ represents the probability that an email message received from a machine on the network is spam given that the machine is compromised.

If the email message is classified as non-spam, the probability ratio may be updated according to the equation $$\Lambda_n \mathrel{+}= \ln\frac{1-\theta_1}{1-\theta_0},$$

wherein $\Lambda_n$ represents the probability ratio, $\theta_0$ represents the probability that an email message received from a machine on the network is spam given that the machine is not compromised, and $\theta_1$ represents the probability that an email message received from a machine on the network is spam given that the machine is compromised.

The present invention also includes a computer system adapted to detect a compromised machine on a network. The system includes a processor and a tangible memory storage including software instructions that cause the computer system to perform the above-described method of detecting compromised machines on a network.

BRIEF DESCRIPTION OF THE DRAWINGS

For a fuller understanding of the invention, reference should be made to the following detailed description, taken in connection with the accompanying drawings, in which:

FIG. 2A is an outline of the spam zombie detection method in accordance with an embodiment of the present invention.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes a tool that may be used to automatically detect compromised machines in a network in an online manner. The present invention includes a method of automatically identifying compromised machines in the network as outgoing messages pass the monitoring point sequentially. The approaches developed in previous work cannot be applied here. The locally generated outgoing messages in a network normally cannot provide the aggregate large-scale spam view required by these approaches. Moreover, these approaches cannot support the online detection requirement in the environment considered here.

An embodiment of the spam zombie detection system was designed based on a statistical method called Sequential Probability Ratio Test (SPRT), developed by A. Wald in his seminal work, *Sequential Analysis*, which is herein incorporated by reference. A. Wald, *Sequential Analysis*, John Wiley & Sons, Inc (1947). SPRT is a powerful statistical method that can be used to test between two hypotheses (in this case, the machine is compromised vs. the machine is not compromised), as the events (in our case, outgoing messages) occur sequentially. SPRT minimizes the expected number of observations required to reach a decision among all the sequential and non-sequential statistical tests with no greater error rates. This means that the spam zombie detection system can identify a compromised machine quickly. Moreover, both the false positive and false negative probabilities of SPRT can be bounded by user-defined thresholds. Consequently, users of the spam zombie detection system can select the desired thresholds to control the false positive and false negative rates of the system.

Figure 1:
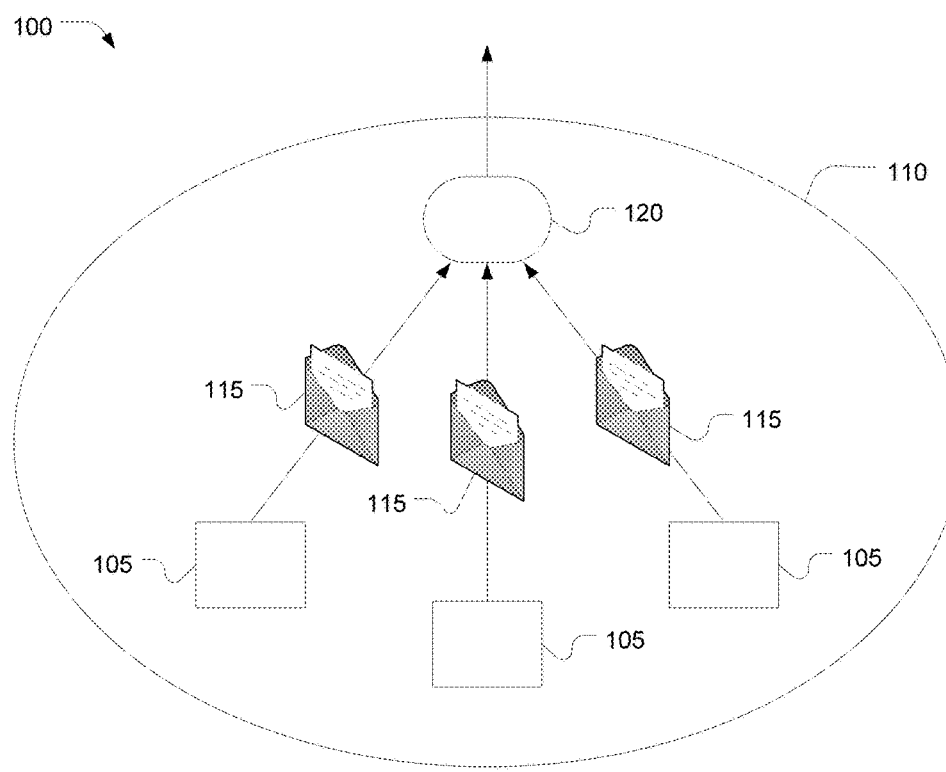
FIG. 1 is a diagram illustrating an example network utilizing the spam zombie detection system in accordance with an embodiment of the present invention.

FIG. 1 illustrates the logical view of example network model 100. In this example, messages 115 originate from machines 105 inside network 110 and will pass the deployed spam zombie detection system 120. This network model can be achieved in a few different scenarios. First, in order to alleviate the ever-increasing spam volume on the Internet, many ISPs and networks have adopted the policy that all the outgoing messages originated from the network must be relayed by a few designated mail servers in the network.

Outgoing email traffic (with destination port number of 25) from all other machines in the network is blocked by edge routers of the network. In this situation, the detection system can be co-located with the designated mail servers in order to examine the outgoing messages. Second, in a network where the aforementioned blocking policy is not adopted, the outgoing email traffic can be replicated and redirected to the spam zombie detection system. The detection system does not need to be on the regular email traffic forwarding path; the system only needs a replicated stream of the outgoing email traffic. Moreover, the spam zombie detection system works even if it cannot observe all outgoing messages. It only requires a reasonably sufficient view of the outgoing messages originated from the network in which it is deployed.

A machine in the network is assumed to be either compromised or normal (i.e., not compromised). Here, the focus is on the compromised machines that are involved in spamming. Therefore, the term compromised machine is used to denote a spam zombie and the two terms are used interchangeably. Let $X_i$ for i=1, 2, . . . denote the successive observations of a random variable X corresponding to the sequence of messages originated from machine m inside the network. Let $X_i=1$ if message i from the machine is a spam, and $X_i=0$ otherwise. The detection system assumes that the behavior of a compromised machine is different from that of a normal machine in terms of the messages they send. Specifically, a compromised machine will with a higher probability generate a spam message than a normal machine. Formally, $$Pr(X_i=1|H_1) > Pr(X_i=1|H_0), \quad (1)$$

where $H_1$ denotes that machine m is compromised and $H_0$ denotes that the machine is normal.

The sending machine, as observed by the spam zombie detection system, may be any machine that generates or forwards email. Such machines may include, for example, end-user client machines or mail relay servers. A mechanism to classify messages as either spam or non-spam is also deployed on the network either at the spam zombie detection system or in communication with it. Such a mechanism may be a spam filter. In an exemplary embodiment the spam filter is a content-based spam filter. The spam filter does not need to be perfect in terms of the false positive rate and the false negative rate. An increasing number of networks have started filtering outgoing messages in recent years.

In its simplest form, SPRT is a statistical method for testing a simple null hypothesis against a single alternative hypothesis. Intuitively, SPRT can be considered as a one-dimensional random walk with two user-specified boundaries corresponding to the two hypotheses. As the samples of the concerned random variable arrive sequentially, the walk moves either upward or downward one step, depending on the value of the observed sample. When the walk hits or crosses either of the boundaries for the first time, the walk terminates and the corresponding hypothesis is selected. In essence, SPRT is a variant of the traditional probability ratio tests for testing under what distribution (or with what distribution parameters) it is more likely to have the observed samples. However, unlike traditional probability ratio tests that require a pre-defined number of observations, SPRT works in an online manner and updates as samples arrive sequentially. Once sufficient evidence for drawing a conclusion is obtained, SPRT terminates.

In SPRT, both the actual false positive and false negative probabilities of SPRT can be bounded by the user-specified error rates. This means that users of SPRT can pre-specify the desired error rates. A smaller error rate tends to require a larger number of observations before SPRT terminates. Thus users can balance the performance and cost of an SPRT test. Second, SPRT minimizes the average number of the required observations for reaching a decision for a given error rate, among all sequential and non-sequential statistical tests. This means that SPRT can quickly reach a conclusion to reduce the cost of the corresponding experiment, without incurring a higher error rate. The formal definition and a number of properties of SPRT are presented below.

Let X denote a Bernoulli random variable under consideration with an unknown parameter θ, and $X_1$, $X_2$, . . . the successive observations on X. As discussed above, SPRT is used for testing a simple hypothesis $H_0$ that $\theta=\theta_0$ against a single alternative $H_1$ that $\theta=\theta_1$. That is, $$Pr(X_i=1|H_1)=1-Pr(X_i=0|H_0)=\theta_0$$

$$Pr(X_i=1|H_1)=1-Pr(X_i=0|H_1)=\theta_1.$$

To ease exposition and practical computation, the logarithm of the probability ratio is computed instead of the probability ratio in the description of SPRT. For any positive integer n=1, 2, . . . , define $$\Lambda_n = \ln \frac{Pr(X_1, X_2, \ldots, X_n | H_1)}{Pr(X_1, X_2, \ldots, X_n | H_0)} \quad (2)$$

If it is assumed that $X_i$'s are independent (and identically distributed), then $$\Lambda_n = \ln \frac{\prod_1^n Pr(X_i | H_1)}{\prod_1^n Pr(X_i | H_0)} = \sum_{i=1}^n \ln \frac{Pr(X_i | H_1)}{Pr(X_i | H_0)} = \sum_{i=1}^n Z_i \quad (3)$$

where $$Z_i = \ln \frac{Pr(X_i | H_1)}{Pr(X_i | H_0)},$$

which can be considered as the step in the random walk represented by Λ. When the observation is one ($X_i=1$), the constant $$\ln \frac{\theta_1}{\theta_0}$$

is added to the preceding value of Λ. When the observation is zero ($X_i=0$), the constant $$\ln \frac{1-\theta_1}{1-\theta_0}$$

is added.

The Sequential Probability Ratio Test (SPRT) for testing $H_0$ against $H_1$ is then defined as follows. Given two user-specified constants A and B where A<B, at each stage n of the Bernoulli experiment, the value of $\Lambda_n$ is computed as in Eq. (3), then $\Lambda_n \leq A \Rightarrow$ accept $H_0$ and terminate test, $\Lambda_n > B \Rightarrow$ accept $H_1$ and terminate test, $A < \Lambda_n < B \Rightarrow$ take an additional observation. (4)

In the following a number of important properties of SPRT are described. If $H_1$ is considered as a detection and $H_0$ as a normality, an SPRT process may result in two types of errors: false positive, where $H_0$ is true but SPRT accepts $H_1$, and false negative, where $H_1$ is true but SPRT accepts $H_0$. Let $\alpha$ and $\beta$ denote the user-desired false positive and false negative probabilities, respectively. Some fundamental relations exist among $\alpha$, $\beta$, A, and B, $$A \geq \ln\frac{\beta}{1-\alpha}, B \leq \ln\frac{1-\beta}{\alpha},$$

for most practical purposes, the equality can be taken, that is, $$A = \ln\frac{\beta}{1-\alpha}, B = \ln\frac{1-\beta}{\alpha}, \quad (5)$$

This only slightly affects the actual error rates. Formally, let $\alpha'$ and $\beta'$ represent the actual false positive rate and the actual false negative rate, respectively, and let A and B be computed using Eq. (5), then the following relations hold, $$\alpha' \leq \frac{\alpha}{1-\beta}$$

and $$\beta' \leq \frac{\beta}{1-\alpha} \quad (6)$$

and $\alpha' + \beta' \leq \alpha + \beta$. (7)

Eqs. (6) and (7) provide important bounds for $\alpha'$ and $\beta'$. In all practical applications, the desired false positive and false negative rates will be small, for example, in the range from 0.01 to 0.05. In these cases, $$\frac{\alpha}{1-\beta}$$

and $$\frac{\beta}{1-\alpha}$$

very closely equal the desired $\alpha$ and $\beta$, respectively. In addition, Eq. (7) specifies that the actual false positive rate and the false negative rate cannot be both larger than the corresponding desired error rate in a given experiment. Therefore, in all practical applications, the boundaries A and B can be computed using Eq. (5). This will provide at least the same protection against errors as if the precise values of A and B were used for a given pair of desired error rates. The precise values of A and B are difficult to obtain.

Another property of SPRT is the number of observations, N, required before SPRT reaches a decision. The following two equations approximate the average number of observations required when $H_1$ and $H_0$ are true, respectively.

$$E[N|H_1] = \frac{\beta\ln\frac{\beta}{1-\alpha} + (1-\beta)\ln\frac{1-\beta}{\alpha}}{\theta_1 \ln\frac{\theta_1}{\theta_0} + (1-\theta_1)\ln\frac{1-\theta_1}{1-\theta_0}} \quad (8)$$

$$E[N|H_0] = \frac{(1-\alpha)\ln\frac{\beta}{1-\alpha} + \alpha\ln\frac{1-\beta}{\alpha}}{\theta_1 \ln\frac{\theta_1}{\theta_0} + (1-\theta_1)\ln\frac{1-\theta_1}{1-\theta_0}} \quad (9)$$

As shown in the above equations, the average number of required observations when $H_1$ or $H_0$ is true depends on four parameters: the desired false positive and negative rates ($\alpha$ and $\beta$), and the distribution parameters $\theta_1$ and $\theta_0$ for hypotheses $H_1$ and $H_0$, respectively. SPRT does not require the precise knowledge of the distribution parameters $\theta_1$ and $\theta_0$. As long as the true distribution of the underlying random variable is sufficiently close to one of hypotheses compared to another (that is, $\theta$ is closer to either $\theta_1$ or $\theta_0$), SPRT will terminate with the bounded error rates. An imprecise knowledge of $\theta_1$ and $\theta_0$ will only affect the number of required observations for SPRT to reach a decision.

In an embodiment, $H_1$ represents a detection and $H_0$ represents a normality. That is, $H_1$ is true if the concerned machine is compromised, and $H_0$ is true if it is not compromised. In addition, $X_i=1$ if the ith message from the concerned machine in the network is a spam, and $X_i=0$ otherwise. Recall that SPRT requires four configurable parameters from users, namely, the desired false positive probability $\alpha$, the desired false negative probability $\beta$, the probability that a message is a spam when $H_1$ is true ($\theta_1$), and the probability that a message is a spam when $H_0$ is true ($\theta_0$). How these values can be configured is discussed below. Based on the user-specified values of $\alpha$ and $\beta$, the values of the two boundaries A and B of SPRT are computed using Eq. (5).

Figure 2B:
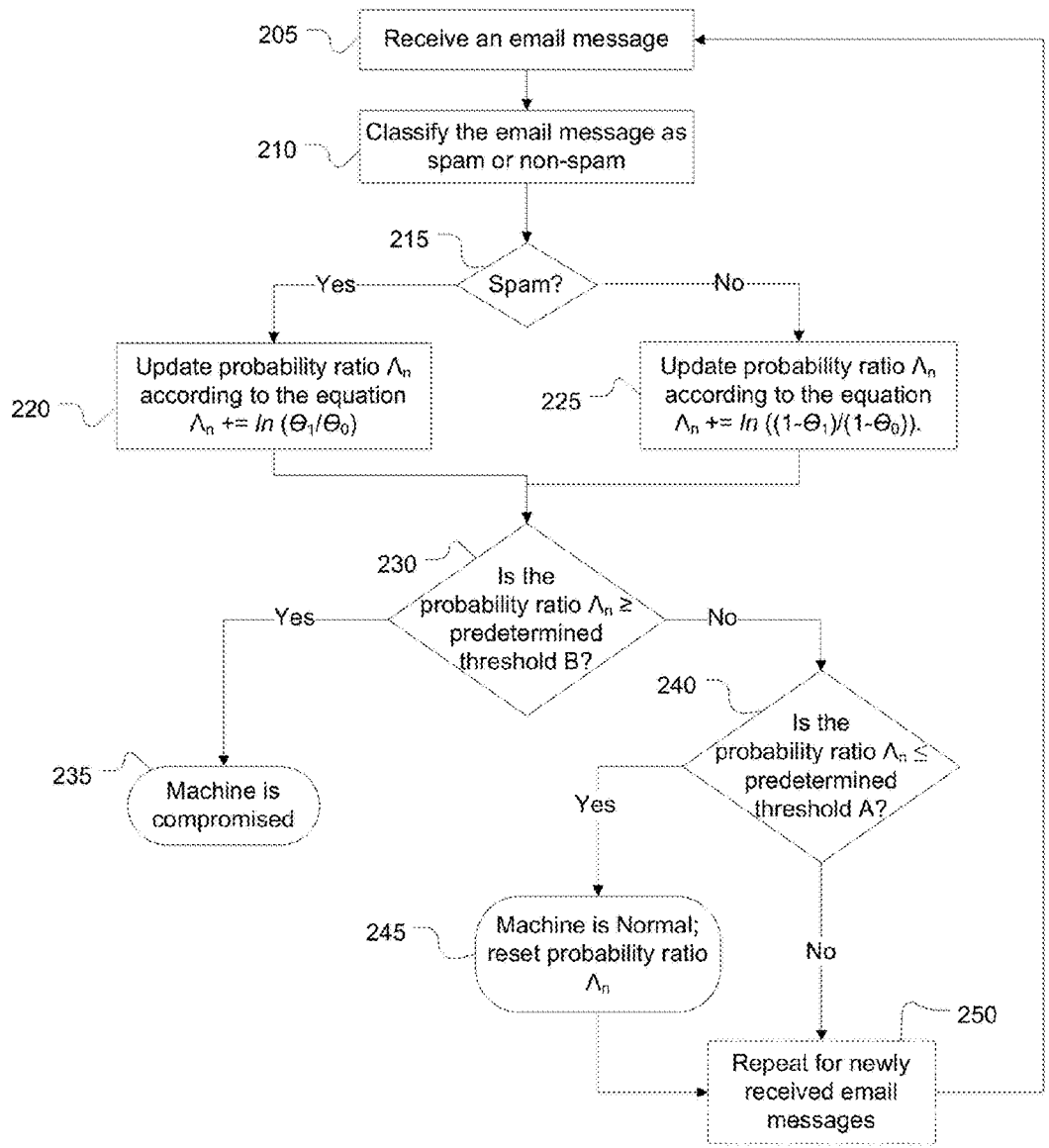
FIG. 2B is a flowchart of the spam zombie detection method in accordance with an embodiment of the present invention.

FIG. 2A outlines the steps of a method of detecting compromised computers (spam zombies) in a network according to an embodiment of the present invention. FIG. 2B is a flowchart of the method. When an outgoing message arrives at the spam zombie detection system (FIG. 2A: line 1; FIG. 2B: operation 205), the sending machine's IP address is recorded (FIG. 2A: line 2), and the message is classified as either spam or non-spam (FIG. 2A: line 5; FIG. 2B: operation 210). Such classification may be achieved by using a spam filter. The spam filter may be a content-based spam filter. For each observed IP address, the spam zombie detection system maintains the logarithm value of the corresponding probability ratio $\Lambda_n$, whose value is updated according to Eq. (3) as message n arrives from the IP address (FIG. 2A: lines 6 to 12; FIG. 2B: operations 220 and 225). Based on the relationship between $\Lambda_n$ and B (FIG. 2A: line 15; FIG. 2B: operation 230) and the relationship between $\Lambda_n$ and A (FIG. 2A: line 13; FIG. 2B: operation 240), the method determines if the corresponding machine is compromised (FIG. 2A: line 14; FIG. 2B: operation 235), normal (FIG. 2A: line 16; FIG. 2B: operation 245), or a decision cannot be reached (FIG. 2A: line 20; FIG. 2B: operation 250). If the machine is found to be compromised, the method terminates for that machine; however new iterations of the method may continue for other machines in the network. If the machine is found to be normal, the probability ratio $\Lambda_n$ is reset (FIG. 2A: line 17; FIG. 2B: operation 245) and the method repeats for newly received emails (FIG. 2A: line 18; FIG. 2B: operation 250). If a decision could not be reached, then the method repeats for newly received emails (FIG. 2A: line 20; FIG. 2B: operation 250). The method receives and operates on emails in a sequential manner.

In the context of spam zombie detection, from the viewpoint of network monitoring, it is more important to identify the machines that have been compromised than the machines that are normal. After a machine is identified as being compromised (FIG. 2A: lines 13 and 14), it can be added into the list of potentially compromised machines that system administrators can go after to clean. The message-sending behavior of the machine may also be recorded should further analysis be required. Before the machine is cleaned and removed from the list, the spam zombie detection system does not need to further monitor the message sending behavior of the machine.

On the other hand, a machine that is currently normal may get compromised at a later time. Therefore, machines that are found to be normal may be continuously monitored by the spam zombie detection system. Once such a machine is identified by the spam zombie detection system, the records of the machine in the spam zombie detection system are re-set, in particular, the value of $\Lambda_n$ is set to zero, so that a new monitoring phase starts for the machine (FIG. 2A: lines 15 to 18).

The spam zombie detection system uses four user-defined parameters: $\alpha$, $\beta$, $\theta_1$, and $\theta_0$. As discussed above, $\alpha$ and $\beta$ are normally small values in the range from 0.01 to 0.05, which users can easily specify independent of the behaviors of the compromised and normal machines in the network.

Ideally, $\theta_1$ and $\theta_0$ should indicate the true probability of a message being spam from a compromised machine and a normal machine, respectively. However, as discussed previously, $\theta_1$ and $\theta_0$ do not need to accurately model the behaviors of the two types of machines. Instead, as long as the true distribution is closer to one of them than another, SPRT can reach a conclusion with the desired error rates. Inaccurate values assigned to these parameters will only affect the number of observations required by the method to terminate. Moreover, the spam zombie detection system may rely on a (content-based) spam filter to classify an outgoing message into either spam or non-spam. In practice, $\theta_1$ and $\theta_0$ should model the detection rate and the false positive rate of the employed spam filter, respectively. Note that all of the widely-used spam filters have a high detection rate and low false positive rate.

Figure 3:
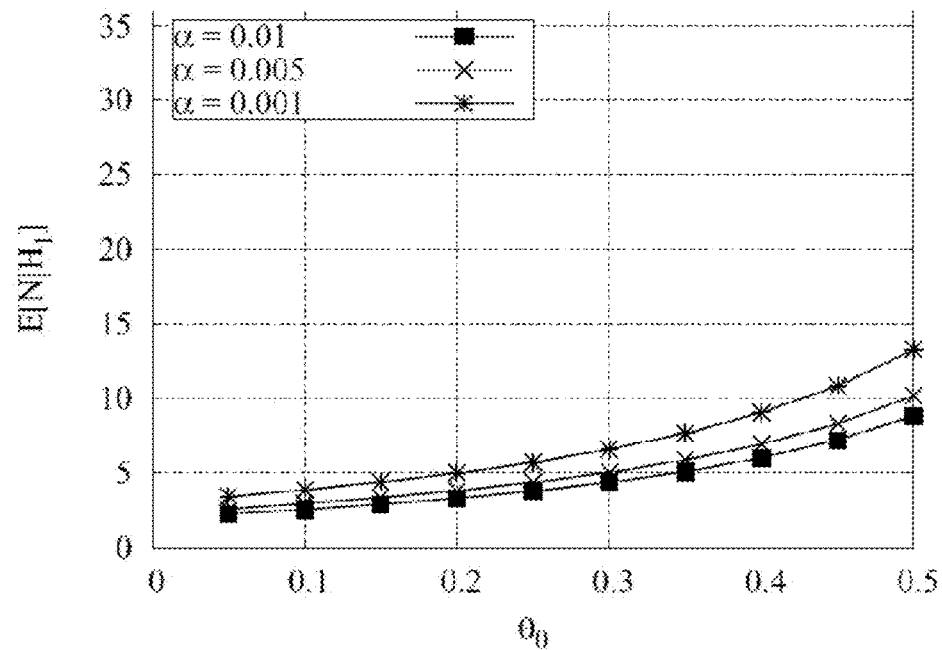
FIG. 3 is a graph showing the average number of required observations of an embodiment of spam zombie detection system when $H_1$ is true ($\beta=0.01$) and $\theta_1=0.9$.
Figure 4:
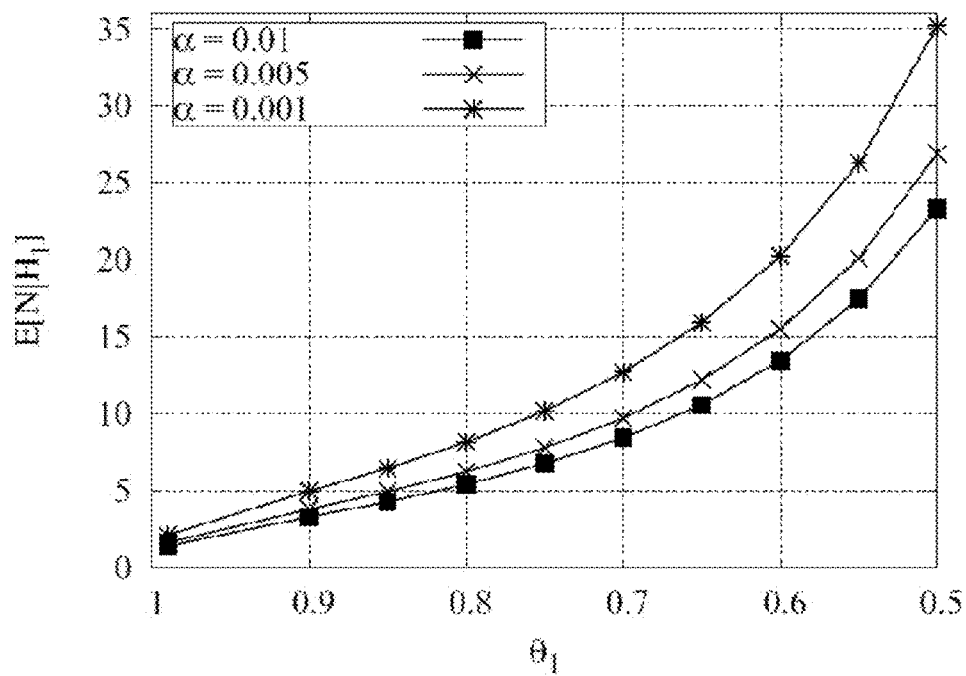
FIG. 4 is a graph showing the average number of required observations of an embodiment of spam zombie detection system when $H_1$ is true ($\beta=0.01$) and $\theta_0=0.2$.

FIGS. 3 and 4 are graphs showing the average number of required observations for SPRT to reach a decision. FIGS. 3 and 4 show the value of $E[N|H_1]$ as a function of $\theta_0$ and $\theta_1$, respectively, for different desired false positive rates. In the figures the false negative rate is set as $\beta=0.01$. In FIG. 3, the probability of a message being spam when $H_1$ is true is assumed to be 0.9 ($\theta_1=0.9$). That is, the corresponding spam filter is assumed to have a 90% detection rate. As shown in the figure, it only takes a small number of observations for SPRT to reach a decision. For example, when $\theta_0=0.2$ (the spam filter has a 20% false positive rate), SPRT requires about three observations to detect that the machine is compromised if the desired false positive rate is 0.01. As the behavior of a normal machine gets closer to that of compromised machine (or rather, the false positive rate of the spam filter increases), i.e., $\theta_0$ increases, a slightly higher number of observations are required for SPRT to reach a detection.

In FIG. 4, the probability of a message being spam from a normal machine is assumed to be 0.2 ($\theta_0=0.2$). That is, the corresponding spam filter has a false positive rate of 20%. As shown in the figure, it also only takes a small number of observations for SPRT to reach a decision. As the behavior of a compromised machine gets closer to that of a normal machine (or rather, the detection rate of the spam filter decreases), i.e., $\theta_1$ decreases, a higher number of observations are required for SPRT to reach a detection.

As shown in FIGS. 3 and 4, as the desired false positive rate decreases, SPRT needs a higher number of observations to reach a conclusion. The same observation applies to the desired false negative rate. These observations illustrate the trade-offs between the desired performance of SPRT and the cost of the method. In the above discussion, the average number of required observations when $H_1$ is true are only shown because a user is likely more interested in the speed of the spam zombie detection system in detecting compromised machines. The study on $E[N|H_0]$ shows a similar trend (not shown).

To ease exposition it was assumed that a sending machine m (FIG. 1) is an end-user client machine. In practice, a network may have multiple subdomains and each has its own mail servers. A message may be forwarded by a number of mail relay servers before leaving the network. The spam zombie detection system can work well in these kinds of network environments. In a first example approach, the spam zombie detection system can be deployed at the mail servers in each subdomain to monitor the outgoing messages so as to detect the compromised machines in that subdomain. In a second example, and possibly more practically, the spam zombie detection system is only deployed at the designated mail servers, which forward all outgoing messages (or the spam zombie detection system gets a replicated stream of all outgoing messages), as discussed previously. The spam zombie detection system may rely on the 'Received:' header fields to identify the originating machine of a message in the network. Given that the 'Received:' header fields can be spoofed by spammers, the spam zombie detection system should only use the 'Received:' header fields inserted by the known mail servers in the network. The spam zombie detection system can determine the reliable 'Received:' header fields by backtracking from the last known mail server in the network that forwards the message. It terminates and identifies the originating machine when an IP address in the 'Received:' header field is not associated with a known mail server in the network.

Given that the spam zombie detection system relies on spam filters to classify messages into spam and non-spam, spammers may try to evade the developed spam zombie detection system by evading the deployed spam filters. They may send completely meaningless non-spam messages (as classified by spam filters). However, this will reduce the real spamming rate, and hence, the financial gains, of the spammers. More importantly, even if a spammer reduces the spam percentage to 50%, the spam zombie detection system can still detect the spam zombie with a relatively small number of observations (25 when $\alpha=0.01$, $\beta=0.01$, and $\theta_0=0.2$). So, trying to send non-spam messages will not help spammers to evade the spam zombie detection system. Moreover, in certain environment where user feedback is reliable, for example, feedback from users of the same network in which the spam zombie detection system is deployed, the spam zombie detection system can rely on classifications from end users (which may be used in addition to the spam filter). Although completely meaningless messages may evade the deployed spam filter, it is impossible for them to remain undetected by end users who receive such messages. User feedbacks may be incorporated into the spam zombie detection system to improve the spam detection rate of the spam filter. As discussed previously, trying to send spam at a low rate will also not evade the spam zombie detection system. The spam zombie detection system relies on the number of (spam) messages, not the sending rate, to detect spam zombies.

For comparison, two alternative designs in detecting spam zombies are presented, one based on the number of spam messages and another based on the percentage of spam messages sent from a machine. For simplicity, they are referred to as the count-threshold (CT) detection method and the percentage-threshold (PT) detection method, respectively.

In CT, the time is partitioned into windows of fixed length T. A user-defined threshold parameter $C_s$ specifies the maximum number of spam message that may be originated from a normal machine in any time window. The system monitors the number of spam messages n originated from a machine in each window. If $n > C_s$, then the method declares that the machine has been compromised.

Similarly, in the PT detection method the time is partitioned into windows of fixed length T. PT monitors two email sending properties of each machine; one is the percentage of spam messages sent from a machine, another the total number of messages. Let N and n denote the total messages and spam messages originated from a machine m within a time window, respectively, then PT declares machine m as being compromised if $N \geq C_a$ and $$\frac{n}{N} > P,$$

where $C_a$ is the minimum number of messages that a machine must send, and P is the user-defined maximum spam percentage of a normal machine. The first condition is in place for preventing high false positive rates when a machine only generates a small number of messages. For example, in an extreme case, a machine may only send a single message and it is a spam, which renders the machine to have a 100% spam ratio. However, it does not make sense to classify this machine as being compromised based on this small number of messages generated.

Exemplary Deployment

In the following, the two alternative spam zombie detection methods are briefly compared with an exemplary deployment of the spam zombie detection system. The three methods have the similar time and space complexities. They all maintain a record for each observed machine and update the corresponding record as messages arrive from the machine. However, unlike the spam zombie detection system, which can provide a bounded false positive rate and false negative rate, and consequently, a confidence how well the spam zombie detection system works, the error rates of CT and PT cannot be a priori specified.

In addition, choosing the proper values for the four user-defined parameters ($\alpha$, $\beta$, $\theta_1$, and $\theta_0$) in the spam zombie detection system is relatively straightforward. In contrast, selecting the "right" values for the parameters of CT and PT are much more challenging. The performance of the two alternative methods is sensitive to the parameters used in the method. They require a thorough understanding of the different behaviors of the compromised and normal machines in the concerned network and training based on the history of the two different behaviors in order for them to work reasonably well in the network.

In the above discussion of the spam zombie detection methods, for simplicity, the potential impact of dynamic IP addresses has been disregarded and it has been assumed that an observed IP corresponds to a unique machine.

However, the spam zombie detection system can work well in the environment of dynamic IP addresses. This is because the spam zombie detection system can reach a decision with a small number of observations (as illustrated in FIGS. 3 and 4, which shows the average number of observations required for SPRT to terminate). In practice, three or four observations should be sufficient for SPRT to reach a decision for the vast majority of cases. If a machine is compromised, it is likely that more than three or four spam messages will be sent before the (unwitting) user shutdowns the machine and the corresponding IP address gets re-assigned to a different machine. Therefore, dynamic IP addresses will not have any significant impact on the spam zombie detection system.

Dynamic IP addresses can have a greater impact on the two alternative detection methods CT and PT. First, both require the continuous monitoring of the sending behavior of a machine for at least a fixed time window, which in practice can be on the order of hours or days. Second, CT also requires a relatively larger number of spam messages to be observed from a machine before reaching a detection. By properly selecting the values for the parameters of CT and PT (for example, a shorter time window for machines with dynamic IP addresses), they can also work reasonably well in the environment of dynamic IP addresses.

The performance of the spam zombie detection system was evaluated based on a two-month email trace collected on a large U.S. college campus network. The potential impact of dynamic IP addresses on the spam zombie detection system was also evaluated.

In the exemplary deployment of the spam zombie detection system, the email trace was collected at a mail relay server deployed on a university campus network. During the course of the email trace collection, the mail server relayed messages destined for 53 subdomains in the campus network. The mail relay server ran a spam filter (SpamAssassin by Apache) to detect spam messages. The email trace contained the following information for each incoming message: the local arrival time, the IP address of the sending machine, and whether or not the message was spam. In addition, if a message had a known virus/worm attachment, it was so indicated in the trace by an anti-virus software. The anti-virus software and the spam filter were two independent components deployed on the mail relay server. Due to privacy issues, there was no access to the content of the messages in the trace.

The messages in the email trace that were forwarded or originated by the university's internal machines were identified, that is, the messages forwarded or originated by an internal machine and destined to a university account. This set of messages is referred to as the university emails and the evaluation of the spam zombie detection system is based on the university emails. The set of university emails does not contain all the outgoing messages originated from inside the university, and the compromised machines identified by the spam zombie detection system based on the university emails will likely be a lower bound on the true number of compromised machines inside the university campus network.

Figures 5, 6, 7, 8:
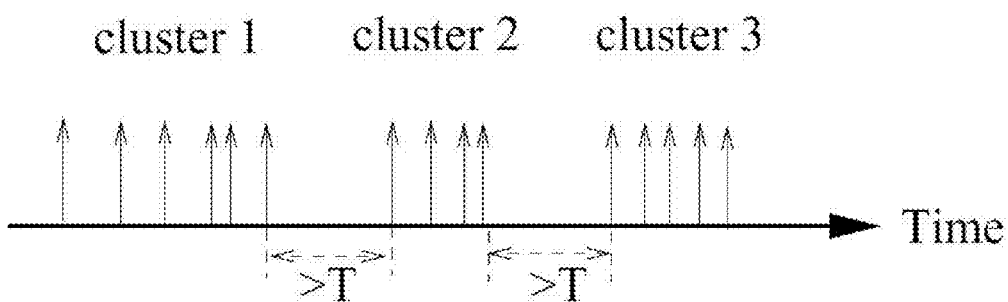
FIG. 5 is a table summarizing an email trace conducted in an exemplary deployment of the spam zombie detection system.
FIG. 6 is a table showing the classifications of the observed IP addresses.
FIG. 7 is a table summarizing the IP addresses sending a virus/worm.
FIG. 8 is an illustration of the message clustering process.

An email message in the trace is classified as either spam or non-spam by the spam filter deployed on the university mail relay server. For ease of exposition, the set of all messages are referred to as the aggregate emails including both spam and non-spam. If a message has a known virus/worm attachment, it is referred to as an infected message. An IP address of a sending machine is referred to as a spam-only IP address if only spam messages are received from the IP. Similarly, an IP address is referred to as non-spam only and mixed if only non-spam messages are received, or both spam and non-spam messages are received, respectively. The table in FIG. 5 shows a summary of the email trace. As shown in the table, the trace contains more than 25 million emails, of which more than 18 million, or about 73%, are spam. During the course of the trace collection, more than 2 million IP addresses (2,461,114) of sending machines were observed, of which more than 95% sent at least one spam message. During the same course, 440 university internal IP addresses were observed. The table in FIG. 6 shows the classifications of the observed IP addresses and the table in FIG. 7 shows a summary of the IP addresses sending a virus/worm. A more detailed analysis of the email trace can be found in Z. Duan et al., including the daily message arrival patterns, and the behaviors of spammers at both the mail-server level and the network level. Z. Duan, K. Gopalan, and X. Yuan, "Behavioral Characteristics of Spammers and Their Network Reachability Properties," in *IEEE International Conference on Communications (ICC)* (June 2007), herein incorporated by reference.

In order to study the potential impacts of dynamic IP addresses on the spam zombie detection system, the subset of university IP addresses in the trace whose domain names contain "wireless" were obtained, which normally have dynamically allocated IP addresses. The messages sent from each of the IP address were grouped into clusters, where the messages in each cluster were likely to be from the same machine (before the IP address was re-assigned to a different machine). Messages were grouped according to the inter-arrival times between consecutive messages, as discussed below. Let $m_i$ $i=1, 2, \ldots$ denote the messages sent from an IP address, and $t_i$ denote the time when message i is received. Then messages $m_i$ for $i=1, 2, \ldots, k$ belong to the same cluster if $|t_i-t_{i-1}| \leq T$ for $i=2, 3, \ldots, k$, and $|t_{i+1}-t_k|>T$, where T is an user-defined time interval. The same process was repeated to group other messages. Let $m_i$ for $i=j, j+1, \ldots, k$ be the sequence of messages in a cluster, arriving in that order. Then, $|t_k-t_j|$ is referred to as the duration of the cluster. FIG. 8 illustrates the message clustering process. From the illustration it can be inferred that, if two messages come closely in time from an IP address (within a time interval T), it is unlikely that the IP address has been assigned to two different machines within the short time interval.

The performance of the spam zombie detection system was evaluated based on the collected university emails. In all the studies, $\alpha=0.01$, $\beta=0.01$, $\theta_1=0.9$, and $\theta_0=0.2$. That is, it was assumed that the deployed spam filter had a 90% detection rate and 20% false positive rate. Many widely-deployed spam filters have much better performance than what was assumed here.

Figures 9, 10:
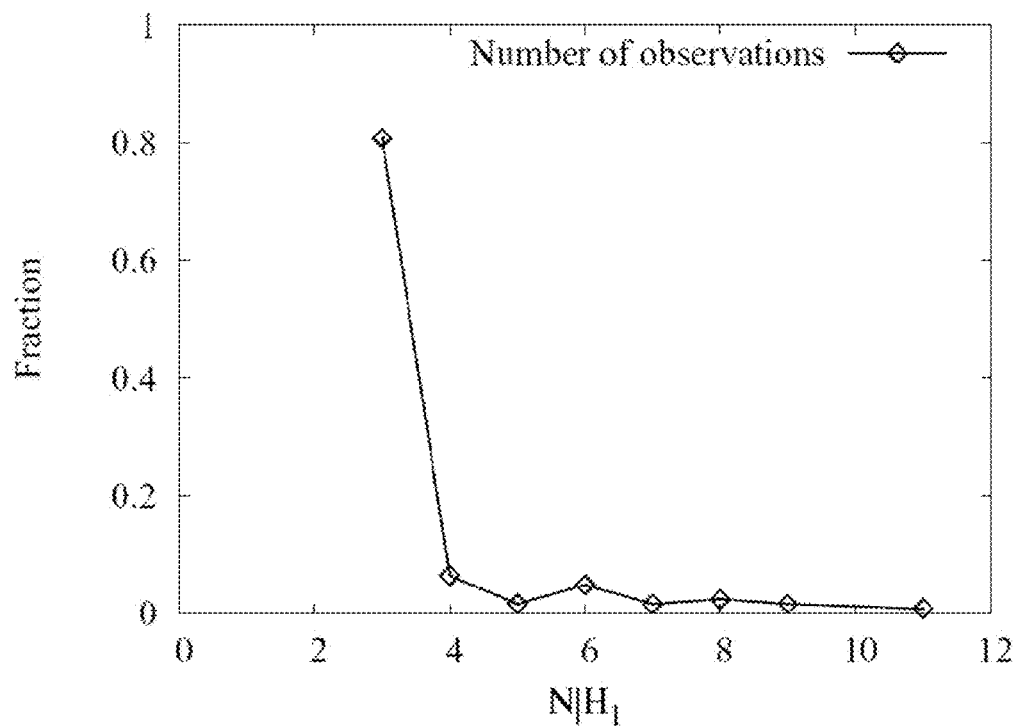
FIG. 9 is a table showing the performance of an exemplary deployment of the spam zombie detection system.
FIG. 10 is a graph showing the number of actual observations that the spam zombie detection system took to detect the compromised machines in an exemplary deployment.

The table shown in FIG. 9 shows the performance of the spam zombie detection system. As discussed above, there are 440 university internal IP addresses observed in the email trace. The spam zombie detection system identified 132 of them to be associated with compromised machines. In order to understand the performance of the spam zombie detection system in terms of the false positive and false negative rates, a number of methods were used to verify if a machine was indeed compromised. First, it was determined if any message sent from an IP address carried a known virus/worm attachment. If so, then there was a confirmation. Out of the 132 IP addresses identified by the spam zombie detection system, 110 of them were confirmed to be compromised with this method. The spam sending patterns of the remaining 22 IP addresses and the domain names of the corresponding machines were then examined. If the fraction of the spam messages from an IP address was high (greater than 98%), then the corresponding machine was considered to be compromised. Sixteen IP addresses were confirmed with this method. The majority (62.5%) of the IP addresses confirmed by the spam percentage are dynamic IP addresses, which further indicates the likelihood of the machines to be compromised.

For the remaining six IP addresses that were not confirmed by either of the above means, their sending patters were manually examined. These IP addresses have a relatively overall low percentage of spam messages over the two month of the collection period. However, they sent substantially more spam messages towards the end of the collection period. This indicates that they may have become compromised towards the end of the collection period.

Evaluating the false negative rate of the spam zombie detection system is somewhat complicated because the spam zombie detection system focuses on the machines that are potentially compromised, but not the machines that are normal. To better understand the false negative rate of the spam zombie detection system, consider the machines that the spam zombie detection system did not identify as being compromised at the end of the email collection period, but for which the spam zombie detection system had re-set the records (lines 15 to 18 in FIG. 2A). Such machines were designated as normal by the spam zombie detection system (but were continuously been monitored). The list of IP addresses that have sent at least a message with a virus/worm attachment was also obtained. Seven of such IP addresses were found to be normal, i.e., missed, by the spam zombie detection system.

In this exemplary embodiment, the infected messages were only used to confirm if a machine was compromised in order to study the performance of the spam zombie detection system. Infected messages were not used by the spam zombie detection system itself. The spam zombie detection system relied on the spam messages instead of infected messages to detect if a machine had been compromised to produce the results in the table of FIG. 9. This is because it is against the interest of a professional spammer to send spam messages with a virus/worm attachment. Such messages are more likely to be detected by anti-virus software, and hence deleted before reaching the intended recipients. This is confirmed by the low percentage of infected messages in the overall email trace shown in the table in FIG. 5. Infected messages are more likely to be observed during the spam zombie recruitment phase instead of the spamming phase. Infected messages can be easily incorporated into the spam zombie detection system to improve its performance.

It should be noted that both the actual false positive rate and the false negative rate were higher than the specified false positive rate and false negative rate, respectively. One possible reason is that the evaluation was based on the university emails, which can only provide a partial view of the outgoing messages originated from inside the university.

FIG. 10 shows the distributions of the number of actual observations that the spam zombie detection system took to detect the compromised machines. As can be seen from the figure, the vast majority of compromised machines can be detected with a small number of observations. For example, more than 80% of the compromised machines were detected by the spam zombie detection system with only three observations. All of the compromised machines were detected with no more than eleven observations. The spam zombie detection system can quickly detect the compromised machines. The spam zombie detection system does not need compromised machines to send spam messages at a high rate in order to detect them. Here, "quick" detection does not mean a short duration, but rather a small number of observations. A compromised machine can send spam messages at a low rate, but it can still be detected once enough observations are obtained by the spam zombie detection system.

In order to understand the potential impacts of dynamic IP addresses on the performance of the spam zombie detection system, messages from a dynamic IP address (with domain names containing "wireless") were grouped into clusters with a time interval threshold of thirty minutes. Messages with a consecutive inter-arrival time no greater than thirty minutes were grouped into the same cluster. Given the short inter-arrival duration of messages within a cluster, all the messages from the same IP address within each cluster were considered as being sent from the same machine. That is, the corresponding IP address has not been re-assigned to a different machine within the concerned cluster. (It is possible that messages from multiple adjacent clusters are actually sent from the same machine.)

Figure 11:
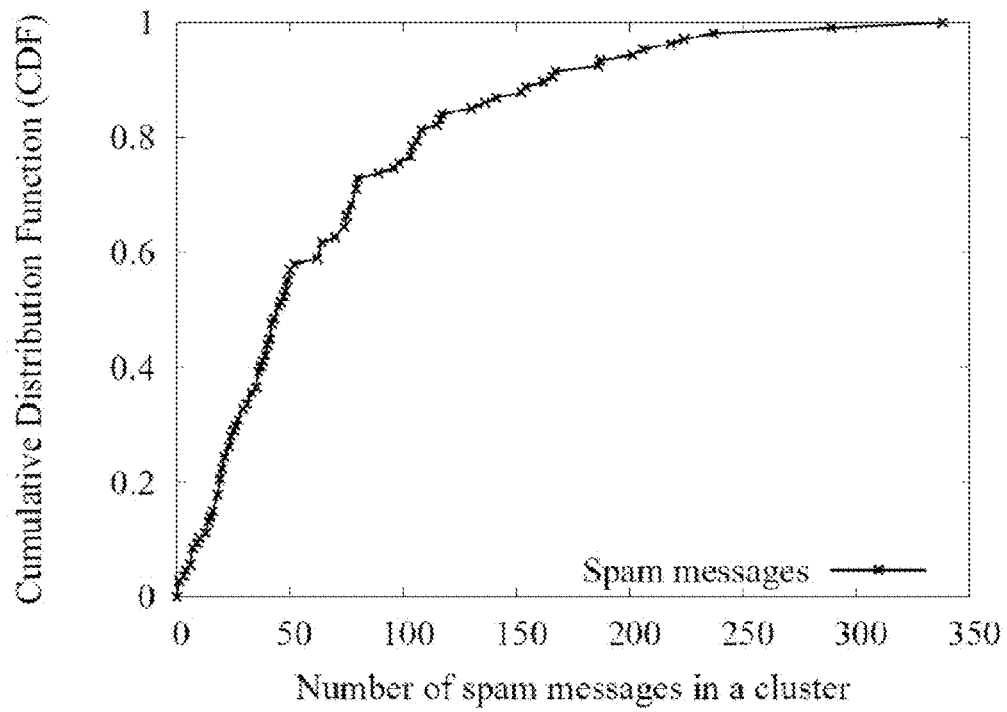
FIG. 11 is a graph showing the distribution of spam messages in a cluster in an exemplary deployment of the spam zombie detection system.
Figure 12:
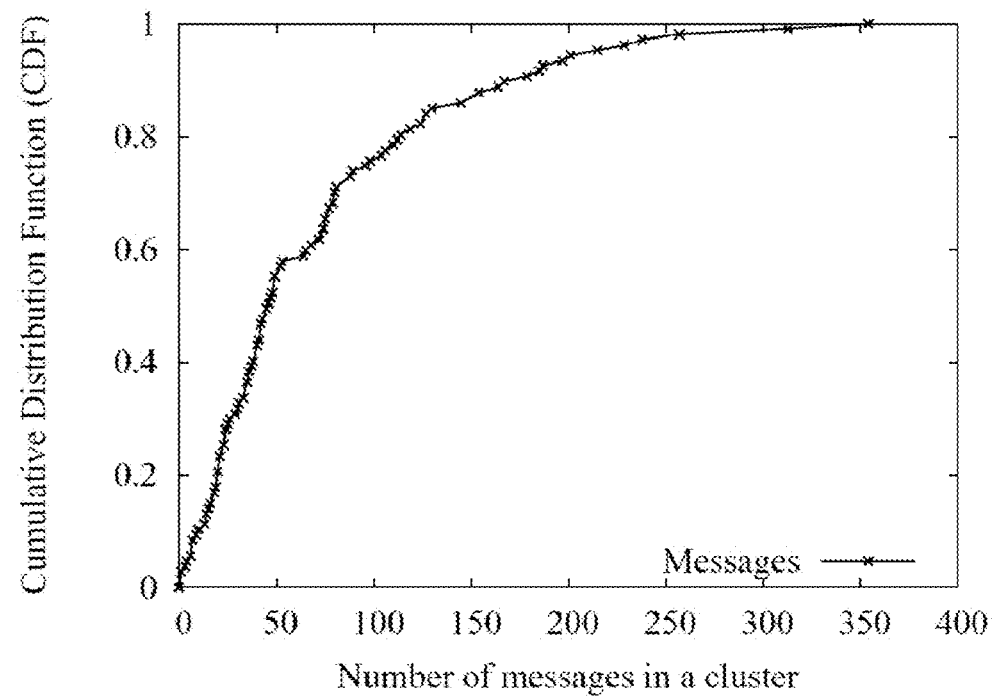
FIG. 12 is graph showing the distribution of the total messages in a cluster in an exemplary deployment of the spam zombie detection system.

FIG. 11 shows the cumulative distribution function (CDF) of the number of spam messages in each cluster. The figure shows that more than 90% of the clusters have no less than ten spam messages, and more than 96% no less than three spam messages. Given the large number of spam messages sent within each cluster, it is unlikely for the spam zombie detection system to mistake one compromised machine as another when it tries to detect spam zombies. Indeed, it was manually checked that, spam messages tend to be sent back to back in a batch fashion when a dynamic IP address is observed in the trace. FIG. 12 shows the CDF of the number of all messages (including both spam and non-spam) in each cluster. Similar observations can be made to that in FIG. 11.

Figure 13:
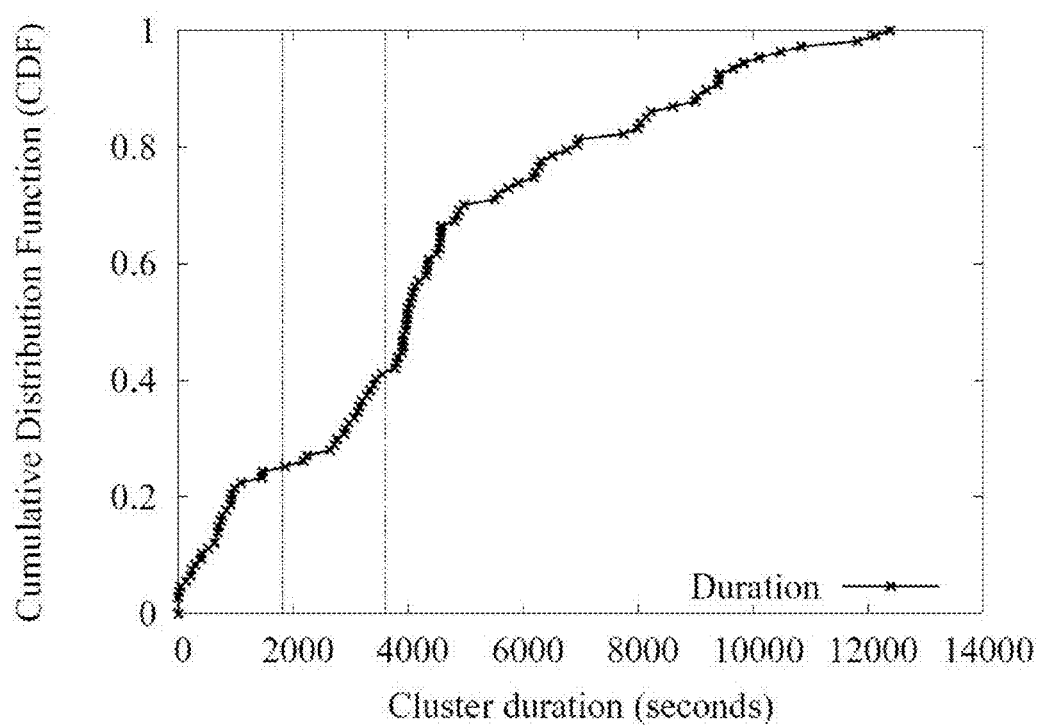
FIG. 13 is graph showing the distribution of the cluster duration in an exemplary deployment of the spam zombie detection system.

FIG. 13 shows the CDF of the durations of the clusters. As illustrated in the figure, more than 75% and 58% of the clusters last no less than thirty minutes and one hour (corresponding to the two vertical lines in the figure), respectively. The longest duration of a cluster observed in the trace was about 3.5 hours.

Given the above observations, in particular, the large number of spam messages in each cluster, it can be concluded that dynamic IP addresses will not have any important impact on the performance of the spam zombie detection system. The spam zombie detection system can reach a decision within the vast majority (96%) of the clusters in the study described here. It is unlikely for the spam zombie detection system to mistake a compromised machine as another.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A computer-implemented method of detecting a compromised machine on a network, comprising:
    receiving an email message from a machine on the network;
    classifying the email message either as spam or nor-spam based on a spam filter or user feedback:
    calculating a probability ratio based on predetermined first and second distribution parameters, the first distribution parameter representing the probability of the email message sent from a normal machine being spam, and the second distribution parameter representing the probability of the email message sent from a compromised machine being spam;
    updating the probability ratio by applying a sequential probability ratio test, wherein the sequential probability test uses the approximate probability that an email message, transmitted by a machine on the network is spam if the computer is compromised and the approximate probability that an email message, transmitted the machine is spam if the computer is not compromised, whereby the probability ratio is updated according to whether the email message was classified as spam or non-spam;
    repeating, for a plurality of email messages, the operations of receiving an email message, classifying the email message, and updating the probability ratio until the probability ratio either rises to or above a first predetermined threshold or falls to or below a second predetermined threshold, wherein the repeated operations are performed on each of the plurality of email messages one at a time as each email message is received;
    classifying the machine as compromised if the probability ratio is greater than or equal to a first predetermined threshold (B};
    classifying the machine as normal if the probability ratio is less than or equal to a second predetermined threshold (A); and
    identifying the machine classified as compromised to a system administrator whereby the compromised machine may be cleaned and wherein detecting a compromised machine on the network further comprising resetting the probability ratio for the machine classified as normal and continuing monitoring the machine.

2. The method of claim 1, wherein the email message originates from the machine.

3. The method of claim 1, wherein the email message is forwarded by the machine.

4. The method of claim 1, wherein the spam filter is a content-based spam filter.

5. A computer system adapted to detect a compromised machine on a network comprising: a processor; and a tangible memory storage including software instructions, wherein the software instruction executed by processor cause the computer system to perform:
    receiving an email message from a machine on the network;
    classifying the email message either as spam or nor-spam based on a spam filter or user feedback;
    calculating a probability ratio based on predetermined first and second distribution parameters, the first distribution parameter representing the probability of the email message sent from a normal machine being spam, and the second distribution parameter representing the probability of the email message sent from a compromised machine being spam;
    updating the probability ratio by applying a sequential probability ratio test, wherein the sequential probability test uses the approximate probability that an email message, transmitted by a machine on the network is spam if the computer is compromised and the approximate probability that an email message, transmitted the machine is spam if the computer is not compromised, whereby the probability ratio is updated according to whether the email message was classified as spam or non-spam;

repeating, for a plurality of email messages, the operations of receiving an email message, classifying the email message, and updating the probability ratio until the probability ratio either rises to or above a first predetermined threshold or falls to or below a second predetermined threshold, wherein the repeated operations are performed on each of the plurality of email messages one at a time as each email message is received;

classifying the machine as compromised if the probability ratio is greater than or equal to a first predetermined threshold (B); and classifying the machine as normal if the probability ratio is less than or equal to a second predetermined threshold (A);

wherein the computer detects a compromised machine on the network and identifying the machine classified as compromised to a system administrator whereby the compromised machine may be cleaned and wherein the computer system detecting a compromised machine on the network further comprising resetting the probability ratio for the machine classified as normal and continuing monitoring the machine.

6. The computer system of claim 5, wherein the email message originates from the machine.

7. The computer system of claim 5, wherein the email message is forwarded by the machine.

8. The computer system of claim 5, wherein the spam filter is a content-based spam filter.

\* \* \* \* \*